United States Patent
Wang et al.

(10) Patent No.: US 11,166,273 B2
(45) Date of Patent: Nov. 2, 2021

(54) METHOD AND APPARATUS FOR DETERMINING TRANSPORT BLOCK SIZE

(71) Applicant: Huawei Technologies Co., Ltd., Shenzhen (CN)

(72) Inventors: Ting Wang, Shanghai (CN); Yuanjie Li, Shanghai (CN); Hao Tang, Shanghai (CN); Zhenfei Tang, Ottawa (CA); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 16/704,558

(22) Filed: Dec. 5, 2019

(65) Prior Publication Data

US 2020/0112948 A1   Apr. 9, 2020

Related U.S. Application Data

(63) Continuation of application No. PCT/CN2018/089371, filed on May 31, 2018.

(30) Foreign Application Priority Data

Jun. 16, 2017 (CN) .......................... 201710459081.5

(51) Int. Cl.
*H04W 72/04* (2009.01)
*H04W 72/12* (2009.01)
*H04L 5/00* (2006.01)

(52) U.S. Cl.
CPC ......... *H04W 72/044* (2013.01); *H04L 5/0016* (2013.01); *H04L 5/0051* (2013.01)

(58) Field of Classification Search
CPC ............ H04W 72/044; H04W 72/0446; H04L 5/0016; H04L 5/0044; H04L 5/0051
See application file for complete search history.

(56) References Cited

U.S. PATENT DOCUMENTS

| 2013/0308504 A1 | 11/2013 | Nimbalker et al. |
| 2014/0044061 A1* | 2/2014 | Yue ...................... H04B 7/0632 370/329 |

(Continued)

FOREIGN PATENT DOCUMENTS

| CN | 101969360 A | 2/2011 |
| CN | 102244628 A | 11/2011 |

(Continued)

OTHER PUBLICATIONS

"Draft Report of 3GPP TSG RAN WG1 #89 v0.1.0 (Hangzhou, China, May 15-19, 2017)," Source: MCC Support, Document for: Comments, 3GPP TSG RAN WG1 Meeting #90, R1-171xxxx, Prague, Czech Rep, Aug. 21-25, 2017, 163 pages.

(Continued)

*Primary Examiner* — Paul H Masur
(74) *Attorney, Agent, or Firm* — Slater Matsil, LLP

(57) ABSTRACT

A method and an apparatus for determining a transport block size, the method including determining, by a communications device, a type of an available resource element (RE) for data scheduling according to a quantity of available REs in one slot and one resource block (RB), and determining, by the communications device, a transport block size of data according to the type of the available RE.

20 Claims, 9 Drawing Sheets

---

30 — A communications device determines a type of an available RE for data scheduling 31 — The communications device determines a transport block size of data based on the type of the available RE

(56) References Cited

U.S. PATENT DOCUMENTS

| | | | |
|---|---|---|---|
| 2018/0048428 | A1 | 2/2018 | Kim et al. |
| 2018/0048498 | A1* | 2/2018 | Stern-Berkowitz .......... H04L 5/0048 |
| 2018/0332569 | A1 | 11/2018 | Golitschek Edler von Elbwart et al. |
| 2020/0022141 | A1 | 1/2020 | Kang et al. |

FOREIGN PATENT DOCUMENTS

| | | |
|---|---|---|
| CN | 102752874 A | 10/2012 |
| CN | 102792621 A | 11/2012 |
| CN | 103548407 A | 1/2014 |
| CN | 106685587 A | 5/2017 |
| EP | 2560451 A2 | 2/2013 |
| JP | 2016515337 A | 5/2016 |

OTHER PUBLICATIONS

"3rd Generation Partnership Project; Technical Specification Group Radio Access Network; Evolved Universal Terrestrial Radio Access (E-UTRA); Physical channels and modulation (Release 14)," 3GPP TS 36.211 V14.2.0, Mar. 2017, 194 pages.

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.2.0, Mar. 2017, 197 pages.

"3rd Generation Partnership Project; Technical Specification Group Radio Access Network; Evolved Universal Terrestrial Radio Access (E-UTRA); Physical layer procedures (Release 14)," 3GPP TS 36.213 V14.2.0 , Mar. 2017, 454 pages.

"TBS Scaling for Short TTI," Agenda Item: 6.2.10.2.7, Source: Ericsson, Document for: Discussion, Decision, 3GPP TSG-RAN WG1 #87, R1-1611528, Reno, USA Nov. 14-18, 2016, 5 pages.

"TBS Determination for Short TTI," Agenda Item: 6.2.10.2.4, Source: Huawei, HiSilicon, Document for: Discussion and Decision, 3GPP TSG RAN WG1 Meeting #87, R1-1611877, Reno, USA, Nov. 14-18, 2016, 4 pages.

"Discussion on TBS Scaling Design for PUSCH in UpPTS," Source: CMCC, Agenda Item: 6.2.7, Document for: Discussion and Decision, 3GPP TSG RAN WG1 Meeting #87, R1-1612174, Reno, USA Nov. 14-18, 2016, 3 pages.

"Support of Flexible Data Channel Durations," Source: Intel Corporation, Agenda item: 71.3.3.1, Document for: Discussion and Decision, 3GPP TSG RAN WG1 #89, R1-1707402, Hangzhou, P.R. China, May 15-19, 2017, 5 pages.

"Discussion on DL Data Scheduling and RA Method for NR," Agenda Item: 7.1.3.3.1, Source: LG Electronics, Document for: Discussion and decision, 3GPP TSG RAN WG1 Meeting #89, R1-1707650, Hangzhou, P.R. China, May 15-19, 2017, 5 pages.

"DL Resource Allocation: Time Domain Aspects," Agenda item: 7.1.3.3.1, Source: Samsung, Document for: Discussion and Decision, 3GPP TSG RAN WG1 Meeting #89, R1-1708018, Hangzhou, China, May 15-19, 2017, 4 pages.

"On Resource Allocation and TBS Determination for PDSCH and CP-OFDM Based PUSCH in NR," Agenda item: 7.1.3.3.1, Source: Nokia, Alcatel-Lucent Shanghai Bell, Document for: Discussion and Decision, 3GPP TSG RAN WG1#89, R1-1708521, Hangzhou, China, May 15-19, 2017.

"Discussion on TB Size Determination," Agenda item:7.1.3.3.1, Source: Qualcomm Incorporated, Document for: Discussion and Decision, 3GPP TSG RAN WG1 #89, R1-1708624, May 15-19, 2017, 3 pages.

"Final Report of 3GPP TSG RAN WG1 #88bis v1.0.0 (Spokane, USA, Apr. 3-7, 2017)," Source: MCC Support, Document for: Approval, 3GPP TSG RAN WG1 Meeting #89, R1-1708890, Hangzhou, China, May 15-29, 2017, 154 pages.

"On MCS/transport Block Size Determination for PDSCH," Agenda Item: 71.3.3.1, Source: Ericsson, Document for: Discussion and Decision, 3GPP TSG-RAN WG1 Meeting #89, R1-1709093, Hangzhou, China, May 15-19, 2017, 5 pages.

\* cited by examiner

METHOD AND APPARATUS FOR DETERMINING TRANSPORT BLOCK SIZE

CROSS-REFERENCE TO RELATED APPLICATIONS

This application is a continuation of International Application No. PCT/CN2018/089371, filed on May 31, 2018, which claims priority to Chinese Patent Application No. 201710459081.5, filed on Jun. 16, 2017. The disclosures of the aforementioned applications are hereby incorporated by reference in their entireties.

TECHNICAL FIELD

This application relates to the field of communication technologies, and in particular, to a method and an apparatus for determining a transport block size.

BACKGROUND

In a long term evolution (LTE) system, a transport block size (TBS) is determined by searching a TBS table based on a modulation and coding scheme (MCS) and a quantity of allocated resource blocks (RB).

However, data scheduling may be more flexible in a fifth generation mobile communications technology (5G) new radio (NR) system. For example, a specific start location and an end location in time domain are indicated during data scheduling. A quantity of symbols that can be used in each slot may change dynamically, and different quantities of resource elements (RE) can be used in different symbols. In frequency domain, different quantities of REs can be used in different RBs.

A method for determining a TBS in LTE cannot flexibly support a case in which different quantities of REs can be used in different RBs. Therefore, the method for determining a TBS in LTE cannot meet a requirement for determining a TBS in the NR system.

SUMMARY

An embodiment of this application provides a method and an apparatus for determining a transport block size, to accurately determine a transport block size when different quantities of REs can be used in different RBs, thereby improving system performance.

According to a first aspect, a method for determining a transport block size is provided, including determining, by a communications device, a type of an available resource element RE for data scheduling, and determining, by the communications device, a transport block size of data based on the type of the available RE. In this way, the communications device can accurately determine the transport block size of the data based on the type of the available RE for data scheduling, so that a system requirement can be met, and system performance can be improved.

With reference to the first aspect, in a possible design, the determining, by a communications device, a type of an available RE for data scheduling includes determining, by the communications device, a classification criterion of available REs, and determining the type of the available RE for data scheduling based on the classification criterion of the available REs, where the classification criterion is determined based on a symbol feature of $X_1$ symbols in time domain and/or an RB feature of $Y_1$ RBs in frequency domain, or the classification criterion is determined based on a symbol feature of $X_2$ symbols in time domain and/or a resource block group (RBG) feature of $Y_2$ RBGs in frequency domain, or the classification criterion is determined based on a slot feature of $X_3$ slots in time domain and/or an RB feature of $Y_3$ resource blocks RBs in frequency domain, or the classification criterion is determined based on a slot feature of $X_4$ slots in time domain and/or an RBG feature of $Y_4$ RBGs in frequency domain, or the classification criterion is a quantity of available REs for data scheduling, where $X_1$, $X_2$, $X_3$, $X_4$, $Y_1$, $Y_2$, $Y_3$, and $Y_4$ are positive integers. In this design, a plurality of classification criteria of available REs are flexibly designed, and a specific classification criterion used by the communications device in actual application may be flexibly selected based on system performance.

With reference to the first aspect, in a possible design, the symbol feature includes at least one of information about a reference signal in the symbols and a quantity of available REs in the symbols, the RB feature includes at least one of information about a reference signal in the RBs and a quantity of available REs in the RBs, the slot feature includes at least one of information about a reference signal in the slots, a quantity of available REs in the slots, and a quantity of available symbols in the slots, and the RBG feature includes at least one of information about a reference signal in the RBGs, a quantity of available REs in the RBGs, and a quantity of available RBs in the RBGs. In this design, the classification criterion can be flexibly designed based on a designed time-frequency feature, to further determine the type of the available RE. Because different TBS values are determined based on different types of REs, the TBS size of the data is accurately determined based on the type of the available RE.

With reference to the first aspect, in a possible design, the information about the reference signal includes at least one of whether there is the reference signal, a quantity of antenna ports of the reference signal, and a quantity of REs occupied by the reference signal. In this design, because the information about the reference signal may be any combination of the foregoing designs, when the classification criterion includes the information about the reference signal, a diverse classification of the available REs may be implemented based on the information about the reference signal, to meet different requirements.

With reference to the first aspect, in a possible design, when the communications device is a terminal, the determining, by the communications device, a classification criterion of available REs includes determining, by the communications device, a predefined classification criterion of the available REs, or receiving first signaling sent by a base station, where the first signaling is used to indicate the classification criterion of the available REs, and when the communications device is a base station, the determining, by the communications device, a classification criterion of available REs includes determining, by the communications device, a predefined classification criterion of the available REs, or configuring, by the communications device, a classification criterion of the available REs based on a service feature of data scheduling. In this design, the classification criteria may be determined in two manners. In one manner, the classification criteria is directly specified in a protocol. This manner is relatively simple and direct, and the base station and a terminal do not need to perform excessive interaction, thereby saving signaling overheads. In the other manner, the base station dynamically configures the classification criterion based on the service feature of data scheduling, and notifies the terminal of the classification criterion.

This manner is characterized by better flexibility, so that different service requirements can be met.

With reference to the first aspect, in a possible design, the determining, by the communications device, the type of the available RE for data scheduling based on the classification criterion of the available REs includes determining, by the communications device, the type of the available RE for data scheduling based on the classification criterion of the available REs and a time-frequency resource for data scheduling.

With reference to the first aspect, in a possible design, the determining, by a communications device, a type of an available RE for data scheduling includes determining, by the communications device, a service type of data, and determining the type of the available RE of the data based on the service type, where different service types correspond to different types of available REs. In this design, different classification criteria may be designed for different service types, so that the service types are distinguished for determining a TBS size of data.

With reference to the first aspect, in a possible design, the determining, by the communications device, a transport block size of data based on the type of the available RE includes determining, by the communications device based on the type of the available RE, a table of the transport block size corresponding to the type of the available RE, and determining the transport block size of the data based on the table of the transport block size, or determining, by the communications device, the transport block size of the data based on the type of the available RE and a correspondence between the type of the available RE and the transport block size, or determining, by the communications device, a scale factor corresponding to the type of the available RE, and multiplying the scale factor by a preset value, to obtain the transport block size of the data, where the preset value is determined based on a preset table of the transport block size, or is calculated based on a modulation scheme, a code rate, a quantity of transmission layers, and a first quantity of available REs of the communications device, and the first quantity of available REs is predefined or determined based on a time-frequency resource for data scheduling, or determining, by the communications device, a second quantity of available REs that is corresponding to the type of the available RE, and obtaining the transport block size of the data through calculation by using a modulation scheme, a code rate, a quantity of transmission layers, and the second quantity of available REs of the communications device. In the foregoing design, different types of available REs correspond to different TBS tables or TBS values or preset values or different calculation methods, and therefore, a TBS value of data of a corresponding type is determined, and system performance is improved.

According to a second aspect, an apparatus for determining a transport block size is provided, including a first determining unit, configured to determine a type of an available resource element RE for data scheduling, and a second determining unit, configured to determine a transport block size of data based on the type of the available RE.

With reference to the second aspect, in a possible design, when determining the type of the available RE for data scheduling, the first determining unit is specifically configured to determine a classification criterion of available REs, and determine the type of the available RE for data scheduling based on the classification criterion of the available REs, where the classification criterion is determined based on a symbol feature of $X_1$ symbols in time domain and/or an RB feature of $Y_1$ RBs in frequency domain, or the classification criterion is determined based on a symbol feature of $X_2$ symbols in time domain and/or an RBG feature of $Y_2$ resource block groups RBGs in frequency domain, or the classification criterion is determined based on a slot feature of $X_3$ slots in time domain and/or an RB feature of $Y_3$ resource blocks RBs in frequency domain, or the classification criterion is determined based on a slot feature of $X_4$ slots in time domain and/or an RBG feature of $Y_4$ RBGs in frequency domain, or the classification criterion is a quantity of available REs for data scheduling, where $X_1$, $X_2$, $X_3$, $X_4$, $Y_1$, $Y_2$, $Y_3$, and $Y_4$ are positive integers.

With reference to the second aspect, in a possible design, the symbol feature includes at least one of information about a reference signal in the symbols and a quantity of available REs in the symbols, the RB feature includes at least one of information about a reference signal in the RBs and a quantity of available REs in the RBs, the slot feature includes at least one of information about a reference signal in the slots, a quantity of available REs in the slots, and a quantity of available symbols in the slots, and the RBG feature includes at least one of information about a reference signal in the RBGs, a quantity of available REs in the RBGs, and a quantity of available RBs in the RBGs.

With reference to the second aspect, in a possible design, the information about the reference signal includes at least one of whether there is the reference signal, a quantity of antenna ports of the reference signal, and a quantity of REs occupied by the reference signal.

With reference to the second aspect, in a possible design, when the apparatus is a terminal, the apparatus further includes a receiving unit, configured to receive first signaling sent by a base station, where the first signaling is used to indicate the classification criterion of the available REs, or the first determining unit is specifically configured to determine a predefined classification criterion of the available REs, when the apparatus is a base station, the first determining unit is specifically configured to determine a predefined classification criterion of the available REs, or configure a classification criterion of the available REs based on a service feature of data scheduling.

With reference to the second aspect, in a possible design, when determining the type of the available RE for data scheduling based on the classification criterion of the available REs, the first determining unit is specifically configured to determine the type of the available RE for data scheduling based on the classification criterion of the available REs and a time-frequency resource for data scheduling.

With reference to the second aspect, in a possible design, when determining the type of the available RE for data scheduling, the first determining unit is specifically configured to determine a service type to which the data scheduling belongs, and determine the type of the available RE for data scheduling based on the service type, where different service types correspond to different types of available REs.

With reference to the second aspect, in a possible design, when determining the transport block size of the data based on the type of the available RE, the second determining unit is specifically configured to determine, based on the type of the available RE, a table of the transport block size corresponding to the type of the available RE, and determine the transport block size of the data based on the table of the transport block size, or determine the transport block size of the data based on the type of the available RE and a correspondence between the type of the available RE and the transport block size, or determine a scale factor corresponding to the type of the available RE, and multiply the scale factor by a preset value, to obtain the transport block size of the data, where the preset value is determined based on a preset table of a transport block size, or is calculated based on a modulation scheme, a code rate, a quantity of transmission layers, and a first quantity of available REs of the apparatus, and the first quantity of available REs is predefined or determined based on the time-frequency resource for data scheduling, or determine a second quantity of available REs that is corresponding to the type of the available RE, and obtain the transport block size of the data through calculation by using a modulation scheme, a code rate, a quantity of transmission layers, and the second quantity of available REs of the apparatus.

According to a third aspect, a communications device is provided, where the communications device is a terminal or a base station, and the communications device has a function of implementing a behavior of a communications device in the foregoing method example of the first aspect. The function may be implemented by hardware. A structure of the communications device includes a memory, configured to store a computer executable program code, a communications interface, and a processor. The processor is coupled with the memory and the communications interface. The program code stored in the memory includes an instruction. When the processor executes the instruction, the instruction enables the communications device to perform the method performed by the communications device according to any one of the first aspect or the possible designs of the first aspect.

According to a fourth aspect, a computer storage medium is provided. The computer storage medium is configured to store a computer software instruction used by the foregoing communications device, and the computer storage medium includes a program that is designed for executing the foregoing aspects.

According to a fifth aspect, a computer program product that includes an instruction is provided. When the computer program product runs on a computer, the computer is configured to perform the method according to the first aspect.

DETAILED DESCRIPTION OF ILLUSTRATIVE EMBODIMENTS

Figure 1:
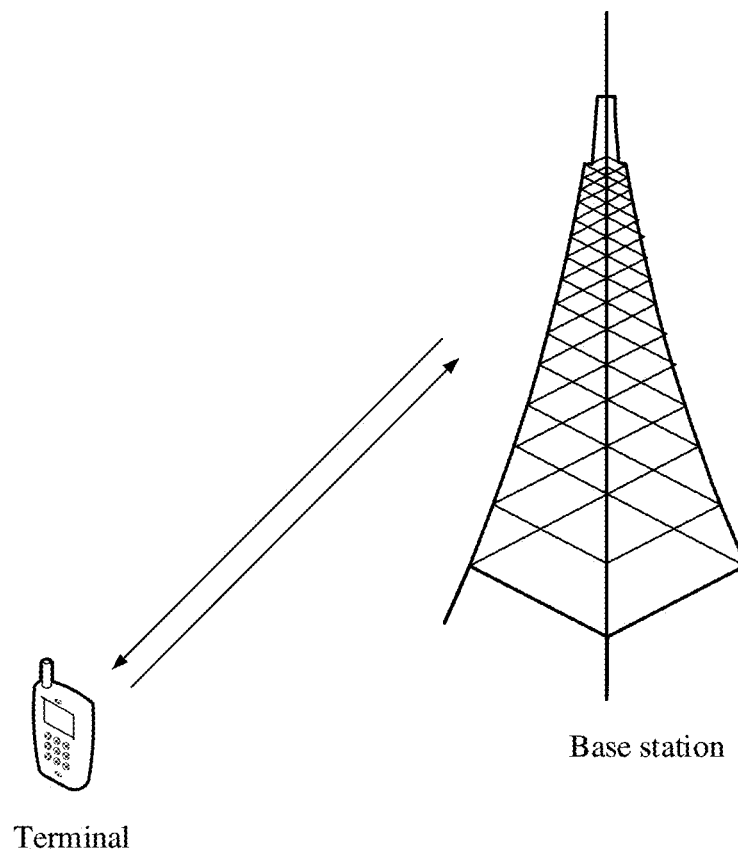
FIG. 1 is a schematic diagram of an application scenario according to an embodiment of this application.

The following clearly describes the technical solutions in the embodiments of this application with reference to accompanying drawings in the embodiments of this application.

The technical solutions provided in this specification may be applied to a 5G NR system (NR system), and may also be applied to a next-generation mobile communications system or another similar mobile communications system.

Some terms in the embodiments of the present invention are described below to help a person skilled in the art have a better understanding.

(1) A terminal is a device that provides voice and/or data connectivity for a user, for example, may include a handheld device with a wireless connection function, or a processing device connected to a wireless modem. The terminal may communicate with a core network by using a radio access network (RAN), and exchange voice and/or data with the RAN. The terminal may include an access point (AP), user equipment (UE), a wireless terminal, a mobile terminal, a subscriber unit, a subscriber station, a mobile station, a mobile console, a remote station, an access point (AP), a remote terminal, an access terminal, a user terminal, a user agent, or a user device, or the like. For example, the terminal may include a mobile phone (or referred to as a "cellular" phone), a computer with a mobile terminal, a portable, pocket-sized, handheld, computer-built-in, or in-vehicle mobile apparatus, and an intelligent wearable device, for example, a device such as a personal communication service (PCS) phone, a cordless telephone set, a session initiation protocol (SIP) phone, a wireless local loop (WLL) station, a personal digital assistant (PDA), a smartwatch, a smart helmet, smart glasses, or a smart band.

(2) A base station is a device that communicates with a wireless terminal through one or more sectors on an air interface in an access network. The base station may be configured to mutually convert a received over-the-air frame and an Internet protocol (IP) packet, and serve as a router between the terminal and a remaining part of the access network. The remaining part of the access network may include an IP network. The base station may coordinate attribute management of the air interface. For example, the base station may include an evolved NodeB (eNB, e-NodeB, evolutional Node B) in an LTE system or an LTE-Advanced system (LTE-A), or a small cell (micro/pico eNB) in an LTE system or an LTE-A system, or may also include a next generation NodeB (next generation node B, gNB) in an NR system, or a transmission point (TP), or may be a transceiver node (TRP), or the like. This is not limited in the embodiments of this application.

(3) In the embodiments of this application, the terms "system" and "network" may be used interchangeably, and "a plurality of" refers to two or more than two. In view of this, "a plurality of" may also be understood as "at least two" in the embodiments of this application. The term "and/or" describes an association relationship for describing associated objects and represents that three relationships may exist. For example, A and/or B may represent the following three cases: only A exists, both A and B exist, and only B exists. In addition, the character "/", unless otherwise specified, generally indicates an "or" relationship between the associated objects.

To better understand the technical solutions provided in the embodiments of this application, the following first describes an application scenario of the embodiments of this application.

FIG. 1 shows an application scenario according to an embodiment of this application. A terminal and a base station are included in FIG. 1. The terminal may exchange information with the base station. The base station can transmit downlink data to the terminal, and the terminal may also receive the downlink data transmitted by the base station. In addition, the terminal can further transmit uplink data to the base station, and the base station may also receive the uplink data transmitted by the terminal. A method for determining a TBS in this application may be for a transport block size of uplink data, or may be for a transport block size of downlink data. This is not specifically limited herein.

Figure 2:
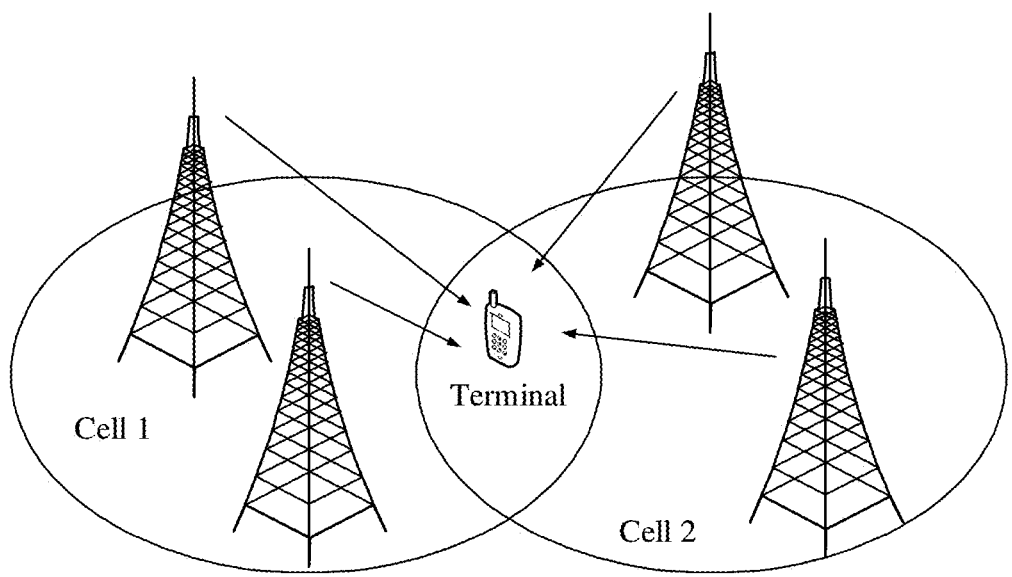
FIG. 2 is a schematic diagram of another application scenario according to an embodiment of this application.

In addition to the application scenario shown in FIG. 1, the embodiments of this application may be further applied to a joint transmission scenario. Existing coordinated multipoint transmission (CoMP) is used as an example. An existing multiple-input multiple-output (MIMO) technology (including a diversity technology used for improving transmission reliability and a multiflow technology used for improving a data transmission rate) is combined with coordinated multipoint transmission, to form a distributed multiple-antenna system, to better serve a user. FIG. 2 is a schematic diagram of an application scenario of coordinated transmission between a plurality of antenna sites. The embodiments of this application are also applicable to a scenario of a homogeneous network and a scenario of a heterogeneous network, and imposes no limitation to a transmission point. The coordinated multipoint transmission may be performed between a macro base station and a macro base station, a micro base station and a micro base station, or a macro base station and a micro base station. In addition, the embodiments of this application are applicable to a frequency division duplex (FDD)/time division duplex (TDD)/flexible duplex (Dynamic Time Division Duplexing, D-TDD) system, and are applicable to both a low frequency scenario (for example, a frequency is less than or equal to 6 GHz) and a high frequency scenario (for example, a frequency is greater than 6 GHz).

In an NR system, there are a plurality of possibilities for implementing more flexible data scheduling. Therefore, a terminal and a base station cannot determine a TBS for data scheduling based on a method in LTE, and consequently, normal data scheduling cannot be implemented. To resolve the technical problem, the technical solutions of the embodiments of this application are provided. The following describes the technical solutions with reference to the accompanying drawings. In the following description process, that the technical solutions provided in the embodiments of this application are applied to the application scenario shown in FIG. 1 or FIG. 2 is used as an example. If the technical solutions provided in the embodiments of this application are applied to the application scenario shown in FIG. 2, it may be considered that the embodiments of this application are described from a perspective of any one of base stations.

Figure 3:
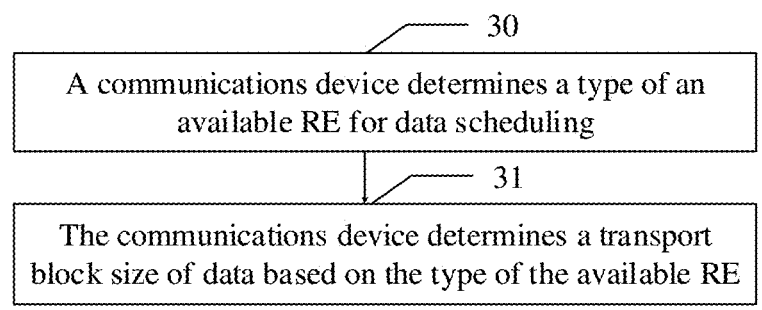
FIG. 3 is a schematic flowchart of a method for determining a transport block size according to an embodiment of this application.

FIG. 3 is a schematic flowchart of a method for determining a transport block size according to an embodiment of this application. The process may be specifically implemented by using hardware, through software programming, or by using a combination of software and hardware.

A communications device may be configured to perform the process shown in FIG. 3. The communications device may be a terminal or a base station. A function module that is in the terminal or the base station and that is configured to execute the solution for determining a transport block size provided in this embodiment of this application may be specifically implemented by using hardware, through software programming, or by using a combination of software and hardware. The hardware may include one or more signal processing circuits and/or dedicated integrated circuits.

As shown in FIG. 3, the process specifically includes the following processing process.

Step 30: A communications device determines a type of an available RE for data scheduling.

It should be noted that the available RE in this embodiment of this application is an RE that is used to carry data, or may be an RE that does not carry a reference signal (RS). An unavailable RE is an RE that is not used to carry data, or an RE that carries an RS.

Specifically, the communications device may determine the type of the available RE for data scheduling by using the following two implementations.

In a first implementation, the communications device determines a classification criterion of available REs and determines the type of the available RE for data scheduling based on the classification criterion of the available REs. The classification criterion is determined based on a symbol feature of $X_1$ symbols in time domain and/or an RB feature of $Y_1$ RBs in frequency domain, or the classification criterion is determined based on a symbol feature of $X_2$ symbols in time domain and/or an RBG feature of $Y_2$ resource block groups RBGs in frequency domain, or the classification criterion is determined based on a slot feature of $X_3$ slots in time domain and/or an RB feature of $Y_3$ resource blocks RBs in frequency domain, or the classification criterion is determined based on a slot feature of $X_4$ slots in time domain and/or an RBG feature of $Y_4$ RBGs in frequency domain, or the classification criterion is a quantity of available REs for data scheduling, where $X_1$, $X_2$, $X_3$, $X_4$, $Y_1$, $Y_2$, $Y_3$, and $Y_4$ are positive integers.

Specifically, at least one of values of $X_1$, $X_2$, $X_3$, $X_4$, $Y_1$, $Y_2$, $Y_3$, and $Y_4$ may be predefined, or at least one of values of $X_1$, $X_2$, $X_3$, $X_4$, $Y_1$, $Y_2$, $Y_3$ and $Y_4$ may be notified by a base station to a terminal by using signaling. This is not specifically limited herein. The signaling may be higher layer signaling, physical layer signaling, or the like.

It should be noted that the RBG may be a basic unit of resource allocation, and one RBG may include one or more RBs. A specific size of the RBG may be predefined, or may be notified by using signaling. This is not specifically limited herein. Optionally, the size of the RBG may dynamically or semi-statically change. Optionally, the size of the RBG may be at a system level, a bandwidth part level, a user level, or a user group level. This is not specifically limited herein. Optionally, for the size of the RBG, different sizes of RBGs may be used for different channels, or different sizes of RBGs may be used for different services. This is not specifically limited herein.

Optionally, a resource corresponding to the classification criterion may be considered as a reference resource element. For example, if the classification criterion is determined based on the symbol feature of the $X_1$ symbols in time domain and/or the RB feature of the $Y_1$ RBs in frequency domain, a resource corresponding to the $X_1$ symbols in time domain and the $Y_1$ RBs in frequency domain is the reference resource element. Other classification criteria are deduced in a same way. This is not specifically limited herein.

Optionally, the communications device may determine the classification criterion of the available REs by using a resource allocation method or a data scheduling method.

Optionally, different resource allocation methods or data scheduling methods may correspond to different classification criteria of available REs.

The resource allocation method may be a resource allocation type 0, a resource allocation type 1, a resource allocation type 2, or may be a resource allocation type in the prior art, another resource allocation type, an RB-based resource allocation type, an RBG-based resource allocation type, or the like.

The data scheduling method may be a slot-based scheduling method, a mini-slot-based scheduling method, a scheduling method based on slot aggregation, a scheduling method based on mini-slot aggregation, or a scheduling method based on slot and mini-slot aggregation.

When the communications device is a terminal, that the communications device determines a classification criterion of available REs includes the communications device determines a predefined classification criterion of the available REs or receives first signaling sent by a base station, where the first signaling includes the classification criterion of the available REs.

When the communications device is a base station, that the communications device determines a classification criterion of available REs includes the communications device determines a predefined classification criterion of the available REs, or the communications device configures a classification criterion of the available REs based on a service feature of data scheduling.

Specifically, when determining the type of the available RE for data scheduling based on the classification criterion of the available REs, the communications device needs to determine a time-frequency resource for data scheduling, and determine the type of the available RE for data scheduling based on the classification criterion of the available REs and the time-frequency resource for data scheduling.

For example, if the classification criterion of the available REs is whether there is a DMRS in each symbol in one symbol in time domain and one RB in frequency domain, the available REs may be classified into two types by using the classification criterion. If there is a DMRS in the symbol, an available RE belongs to a first type. If there is no DMRS in the symbol, an available RE belongs to a second type. In this case, the time-frequency resource for data scheduling is consecutive three symbols and five RBs. For example, if there is no DMRS in the three symbols, the available RE belongs to the second type. In this case, the communications device obtains a TBS table or a preset TBS value corresponding to the second type, and determines a corresponding TBS value by using the TBS table. The corresponding TBS value is multiplied by 3 to obtain a TBS size of data in the current scheduling.

For another example, if the classification criterion of the available REs is whether there is a CSI-RS in one symbol in time domain and one RBG in frequency domain, the available REs may be classified into four types by using the classification criterion. If there is a CSI-RS in each RB in one symbol and one RBG, an available RE belongs to a first type. If there is no CSI-RS in each RB in one symbol and one RBG, an available RE belongs to a second type. If there is no CSI-RS in one RB in one symbol and one RBG, an available RE belongs to a third type. If there is no CSI-RS in two RBs in one symbol and one RBG, an available RE belongs to a fourth type. In this case, the time-frequency resource for data scheduling is consecutive three symbols and five RBGs, and a specific type to which each of the 15 time-frequency blocks belongs and a quantity of time-frequency blocks of each type are determined. In this case, the communications device obtains a TBS table or a preset TBS value corresponding to each type, and determines a corresponding TBS value by using the TBS table. The corresponding TBS value is multiplied by the quantity of time-frequency blocks of each type to obtain a TBS size of data in the current scheduling.

The symbol feature includes at least one of information about a reference signal in the symbols and a quantity of available REs in the symbols. The RB feature includes at least one of information about a reference signal in the RBs and a quantity of available REs in the RBs. The slot feature includes at least one of information about a reference signal in the slots, a quantity of available REs in the slots, and a quantity of available symbols in the slots. The RBG feature includes at least one of information about a reference signal in the RBGs, a quantity of available REs in the RBGs, and a quantity of available RBs in the RBGs.

Further, the information about the reference signal includes at least one of whether there is the reference signal, a quantity of antenna ports of the reference signal, and a quantity of REs occupied by the reference signal.

The reference signal includes at least one of a demodulation reference signal (DMRS), a channel state information-reference signal (CSI-RS), and a phase-tracking reference signal (PT-RS), and a tracking reference signal (Tracking RS, TRS).

Optionally, the communications device may determine the type of the available RE by using a resource allocation method or a data scheduling method.

Optionally, different resource allocation methods or data scheduling methods may correspond to different types of available RE.

The resource allocation method may be a resource allocation type 0, a resource allocation type 1, a resource allocation type 2, or may be a resource allocation type in the prior art, another resource allocation type, an RB-based resource allocation type, an RBG-based resource allocation type, or the like.

The data scheduling method may be a slot-based scheduling method, a mini-slot-based scheduling method, a scheduling method based on slot aggregation, a scheduling method based on mini-slot aggregation, or a scheduling method based on slot and mini-slot aggregation.

In a second implementation, the communications device determines a service type of data scheduling, and determines the type of the available RE for data scheduling based on the service type, where different service types correspond to different types of available REs.

Step 31: The communications device determines a transport block size of data based on the type of the available RE.

Specifically, the communications device determines the transport block size of the data based on the type of the available RE by using the following four implementations.

Manner 1: The communications device determines, based on the type of the available RE, a table of a transport block size corresponding to the type of the available RE, and determines the transport block size of the data based on the table of the transport block size.

Manner 2: The communications device determines the transport block size of the data based on the type of the available RE and a correspondence between the type of the available RE and the transport block size.

In this manner, different transport block sizes are preset for different types, to save a TBS calculation process.

Manner 3: The communications device determines a scale factor corresponding to the type of the available RE, and multiplies the scale factor by a preset value, to obtain the transport block size of the data, where the preset value is determined based on a preset table of a transport block size, or is calculated based on a modulation scheme, a code rate, a quantity of transmission layers, and a first quantity of available REs of the communications device, and the first quantity of available REs is predefined or determined based on the time-frequency resource for data scheduling.

Specifically, in a possible implementation, a TBS value may be obtained through calculation by using a modulation scheme, a code rate, a quantity of transmission layers, and a first quantity of available REs, and a specific process is as follows.

$$TBS = 8 \times \left\lceil \frac{N_{sf} \times N_{RE}^{sf} \times v \times Q_M \times R}{8} \right\rceil \quad \text{Formula 1}$$

Herein, $\lceil \ \rceil$ represents rounding up, $N_{sf}$ represents a quantity of reference resource elements corresponding to a classification criterion, $N_{RE}^{sf}$ represents a quantity of available REs corresponding to a reference resource element or is a preset quantity of REs, namely, the first quantity of available REs, V represents the quantity of transmission layers, and R represents the code rate.

Manner 4: The communications device determines a second quantity of available REs that is corresponding to the type of the available RE, and obtains the transport block size of the data through calculation by using a modulation scheme, a code rate, a quantity of transmission layers, and the second quantity of available REs of the communications device.

Specifically, a calculation formula is similar to the foregoing formula 1 provided that the first quantity of available REs is replaced with the second quantity of available REs.

Specifically, in a possible implementation, the TBS value may be determined by using a TBS table, and a specific process is as follows.

Table 1 and Table 2 provide specific examples of the TBS table. The communications device may determine a modulation scheme and a TBS index based on an MCS index by using Table 1, and then search Table 2 based on the TBS index and a quantity NRB of allocated RBs, to determine the TBS value.

TABLE 1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |

TABLE 1-continued

| MCS Index $I_{MCS}$ | Modulation Order $Q_m$ | TBS Index $I_{TBS}$ |
|---|---|---|
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 2

| | $N_{RB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |

TABLE 2-continued

| $I_{TBS}$ | $N_{RB}$ | | | | | | | | | |
|---|---|---|---|---|---|---|---|---|---|---|
| | 1 | 2 | 3 | 4 | 5 | 6 | 7 | 8 | 9 | 10 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

The following describes, by using an example, a process of determining the type of the available RE by using different classification criteria. Specifically, a specific classification criterion used by the base station and the terminal may be pre-specified in a protocol, or may be dynamically configured by the base station, and may be notified to the terminal by using signaling. Specific signaling may be higher layer signaling, physical layer signaling, or the like. This is not limited in this application.

In terms of a classification criterion 1, the type of the available RE is determined based on a symbol feature of one symbol in time domain and/or an RB feature of one RB in frequency domain.

Scenario 1: The type of the available RE is determined based on information about a DMRS in the one symbol in time domain and the one RB in frequency domain.

For example, available REs are classified based on whether there is a DMRS in a symbol, to obtain the type of the available RE. The available REs are classified into two types: an RE corresponding to a symbol that includes a DMRS and an RE corresponding to a symbol that includes no DMRS.

For another example, available REs are classified based on a quantity of antenna ports of the DMRS, to obtain a classification criterion of the available REs. Specifically, for example, when the quantity of antenna ports of the DMRS is 0, an available RE belongs to a first type, when the quantity of antenna ports of the DMRS is 1 or 2, an available RE belongs to a second type, when the quantity of antenna ports of the DMRS is 3 or 4, an available RE belongs to a third type, when the quantity of antenna ports of the DMRS is 5 to 8, an available RE belongs to a fourth type.

For another example, available REs are classified based on a quantity of REs occupied by the DMRS, to obtain the type of the available RE. For example, when the DMRS occupies no RE, an available RE belongs to a first type, when the DMRS occupies two REs, an available RE belongs to a second type, when the DMRS occupies four REs, an available RE belongs to a third type, when the DMRS occupies eight REs, an available RE belongs to a fourth type.

For another example, classification is performed based on a quantity of antenna ports of the DMRS and a quantity of REs occupied by the DMRS. For example, when the quantity of antenna ports of the DMRS is 0, and the DMRS occupies no RE, an available RE belongs to a first type. When the quantity of antenna ports of the DMRS is 1 or 2 and the DMRS occupies two REs, or when the quantity of antenna ports of the DMRS is 3 or 4 and the DMRS occupies two REs, an available RE belongs to a second type. When the quantity of antenna ports of the DMRS is 1 or 2 and the DMRS occupies four REs, or when the quantity of antenna ports of the DMRS is 3 or 4 and the DMRS occupies four REs, or when the quantity of antenna ports of the DMRS is 5 to 8 and the DMRS occupies eight REs, or when the quantity of antenna ports of the DMRS is 5 to 8 and the DMRS occupies 16 REs, an available RE belongs to a third type.

Figure 4A:
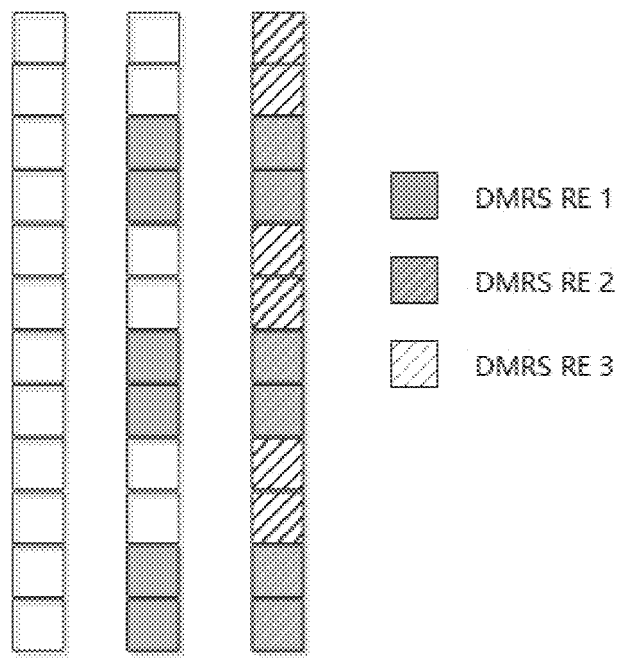
FIG. 4a to FIG. 4f are schematic diagrams of classifying available REs according to an embodiment of this application.
Figure 4B:
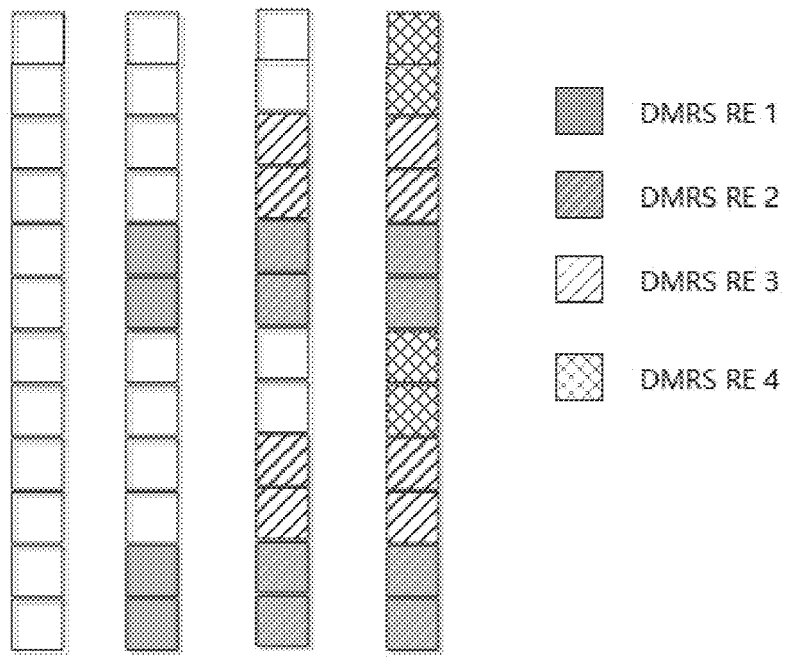
Figure 4C:
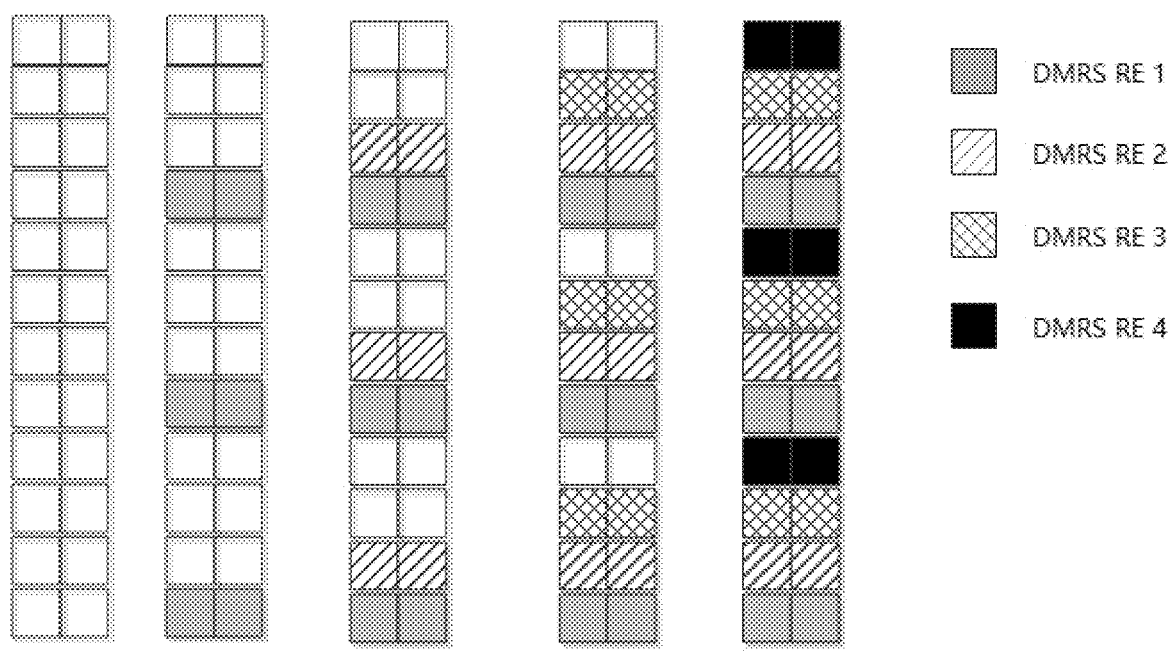

Specifically, FIG. 4a to FIG. 4c show schematic diagrams of classifying available REs based on information about a DMRS in each symbol.

In a DMRS-based classification design in FIG. 4a, available REs of data or REs occupied by a DMRS in each symbol may be classified into three types.

In a DMRS-based classification design in FIG. 4b, available REs of data or REs occupied by a DMRS in each symbol may be classified into four types.

In a DMRS-based classification design in FIG. 4c, available REs of data or REs occupied by a DMRS in each symbol may be classified into five types.

If data scheduling supports a plurality of DMRS-based classification designs, a quantity of available REs of total data or a quantity of REs occupied by a DMRS may be 0, 3, 4, 6, 8, 9, and 12, and available REs may be classified into three types or four types. For example, specifically, when the quantity of available REs of total data or the quantity of REs occupied by the DMRS is 0, an available RE belongs to a first type, when the quantity of available REs of total data or the quantity of REs occupied by the DMRS is 3, 4, or 6, an available RE belongs to a second type, when the quantity of available REs of total data or the quantity of REs occupied by the DMRS is 8 or 9, an available RE belongs to a third type, when the quantity of available REs of total data or the quantity of REs occupied by the DMRS is 12, an available RE belongs to a fourth type.

Scenario 2: The type of the available RE is determined based on information about a CSI-RS/PTRS/TRS in the one symbol in time domain and the one RB in frequency domain.

The CSI-RS/PTRS/TRS and the DMRS in Scenario 1 are applied in a similar manner. Details are not described herein again.

Figure 4D:
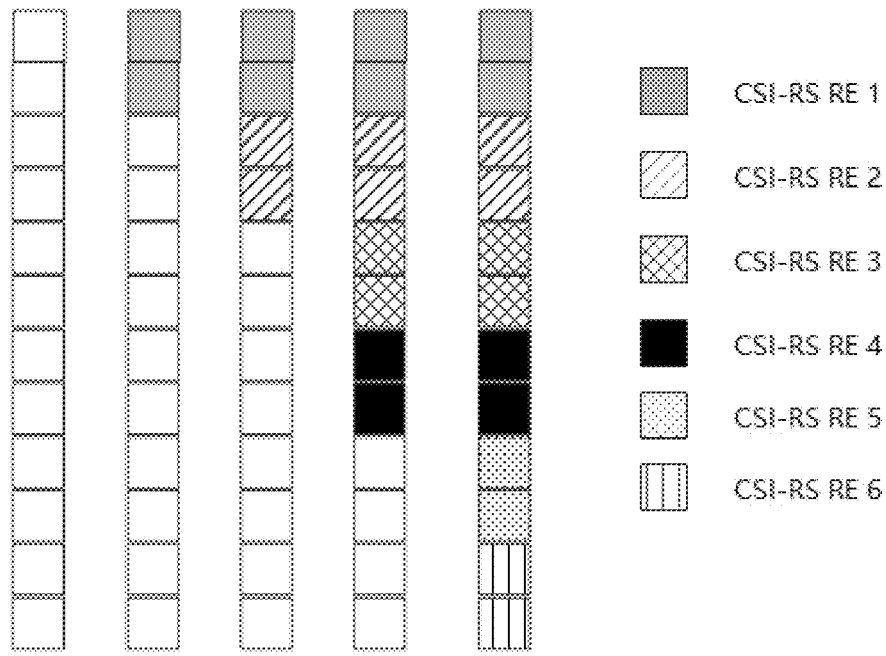
Figure 4E:
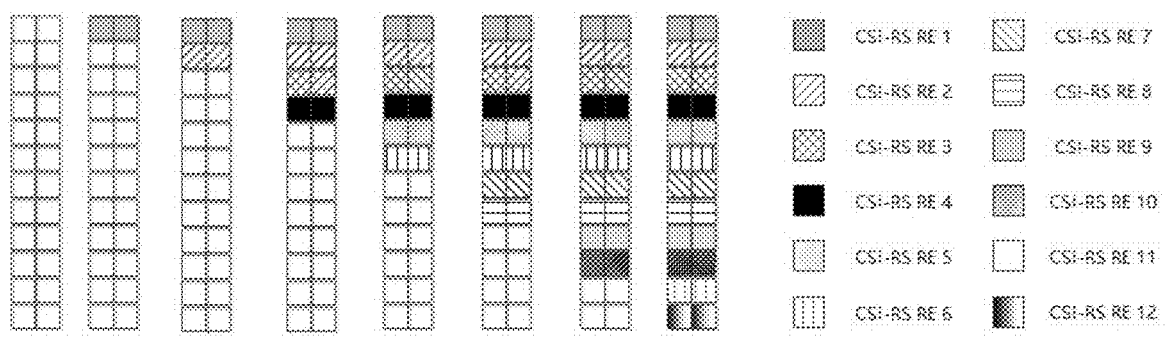
Figure 4F:
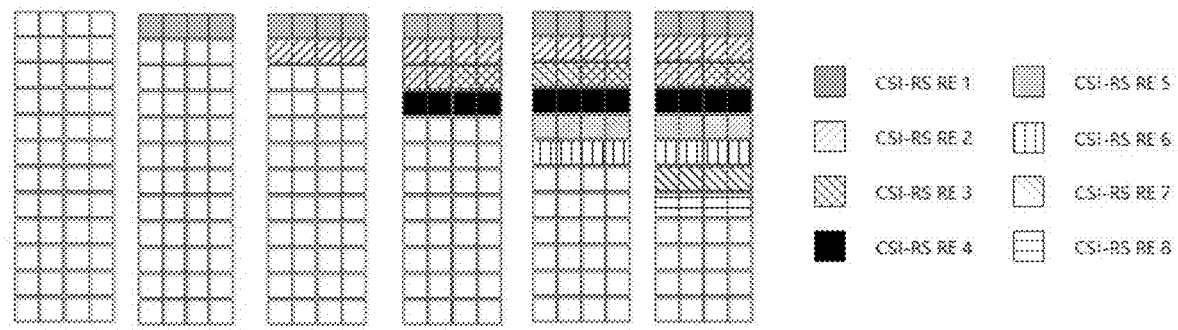

Specifically, FIG. 4d to FIG. 4f show schematic diagrams of classifying available REs based on information about a CSI-RS in each symbol and each RB.

Scenario 3: When different reference signals occupy a same symbol, available REs may also be classified based on a type of a reference signal.

For example, if there is only a DMRS in the symbol, an available RE belongs to a first type, if there is only a CSI-RS in the symbol, an available RE belongs to a second type, if there are both a DMRS and a CSI-RS in the symbol, an available RE belongs to a third type.

Scenario 4: Available REs are classified based on a quantity of available REs in a symbol.

For example, a quantity of available REs in one RB and one symbol may be 0 to 12. Specifically, for example, if the quantity of available REs is 0 to 4, an available RE belongs to a first type, if the quantity of available REs is 5 to 8, an available RE belongs to a second type, if the quantity of available REs is 9 to 12, an available RE belongs to a third type.

It should be noted that at least two of the foregoing four scenarios may also be used in combination. Specifically, for example, when the communications device determines the type of the available RE, the type of the available RE may be jointly determined by considering both information about a DMRS and information about a CSI-RS/PTRS/TRS.

Further, after the type of the available RE is determined, a TBS value of the type is obtained based on the determined type of the available RE.

For example, when the terminal calculates the TBS, the TBS size for data scheduling is obtained by multiplying the TBS value of the type by a product of a quantity of symbols in time domain in the classification criterion 1 and a quantity of RBs in frequency domain in the classification criterion 1.

It should be noted that a mutual conversion between different types may be performed in proportion, and a DMRS is used as an example.

In the DMRS-based classification design in FIG. 4a, a scale factor may be 1 for a first type, may be ½ for a second type, and may be 0 for a third type.

For example, a TBS table corresponding to the first type is formulated, and TBS tables respectively corresponding to the second type and the third type may be obtained through conversion based on scale factors. To be specific, the TBS table corresponding to the second type is obtained by multiplying the TBS table corresponding to the first type by the scale factor ½ of the second type, and the TBS table corresponding to the third type is obtained by multiplying the TBS table corresponding to the first type by the scale factor 0 of the third type.

In the DMRS-based classification design in FIG. 4b, a scale factor may be 1 for a first type, may be ⅔ for a second type, may be ⅓ for a third type, and may be 0 for a fourth type.

For example, a TBS table corresponding to the first type is formulated, and TBS tables respectively corresponding to the second type and the third type may be obtained through conversion based on scale factors. To be specific, the TBS table corresponding to the second type is obtained by multiplying the TBS table corresponding to the first type by the scale factor ⅔ of the second type, the TBS table corresponding to the third type is obtained by multiplying the TBS table corresponding to the first type by the scale factor ⅓ of the third type, and the TBS table corresponding to the fourth type is obtained by multiplying the TBS table corresponding to the first type by the scale factor 0 of the fourth type.

In the DMRS-based classification design in FIG. 4c, a scale factor may be 1 for a first type, may be ¾ for a second type, may be ½ for a third type, may be ¼ for a fourth type, and may be 0 for a fifth type.

For example, a TBS table corresponding to the first type is formulated, and TBS tables respectively corresponding to the second type and the third type may be obtained through conversion based on scale factors. To be specific, the TBS table corresponding to the second type is obtained by multiplying the TBS table corresponding to the first type by the scale factor ¾ of the second type, the TBS table corresponding to the third type is obtained by multiplying the TBS table corresponding to the first type by the scale factor ½ of the third type, the TBS table corresponding to the fourth type is obtained by multiplying the TBS table corresponding to the first type by the scale factor ¼ of the fourth type, and the TBS table corresponding to the fifth type is obtained by multiplying the TBS table corresponding to the first type by the scale factor 0 of the fifth type.

In terms of a classification criterion 2, the type of the available RE is determined based on a symbol feature of one slot in time domain and/or an RB feature of one RB in frequency domain.

Scenario 1: The type of the available RE is determined based on information about a DMRS in the one slot in time domain and the one RB in frequency domain.

For example, available REs are classified based on a quantity of symbols occupied by a DMRS, to obtain the type of the available RE. For example, in a DMRS-based classification design, the available REs may be classified into two types based on a quantity of symbols occupied by a DMRS in each slot. When the DMRS occupies one symbol, an available RE belongs to a first type. When the DMRS occupies two symbols, an available RE belongs to a second type. Alternatively, the available REs may be classified into four types. When the DMRS occupies one symbol, an available RE belongs to a first type. When the DMRS occupies two symbols, an available RE belongs to a second type. When the DMRS occupies three symbols, an available RE belongs to a third type. When the DMRS occupies four symbols, an available RE belongs to a fourth type. Alternatively, the available REs may be classified into two types. When the DMRS occupies one or two symbols, an available RE belongs to a first type. When the DMRS occupies three or four symbols, an available RE belongs to a second type.

For example, available REs are classified based on a quantity of REs occupied by a DMRS in one slot. For example, with reference to a status of a DMRS on a single symbol, a quantity of REs occupied by a DMRS in each slot is 6, 12, or 24. In this case, the available REs are classified into three types. For another example, with reference to a status of a DMRS on a single symbol, a quantity of REs occupied by a DMRS in each slot is 4, 8, 12, 16, or 24. In this case, the available REs are classified into five types. For another example, with reference to a status of a DMRS on a single symbol, a quantity of REs occupied by a DMRS in each slot is 6, 12, 18, or 24. In this case, the available REs are classified into four types.

For example, classification is performed based on a quantity of REs occupied by a DMRS in one slot. For example, a total quantity of occupied REs may be 4, 6, 8, 12, 16, 18, or 24. In this case, available REs may be classified into three types or four types.

Scenario 2: The type of the available RE is determined based on information about a CSI-RS/PTRS/TRS in the one slot in time domain and the one RB in frequency domain.

The CSI-RS/PTRS/TRS and the DMRS in Scenario 1 are applied in a similar manner. Details are not described herein again.

Scenario 3: When different reference signals occupy a same slot, available REs may also be classified based on a type of a reference signal. For example, if there is only a DMRS in the slot, an available RE belongs to a first type, if there is only a CSI-RS in the slot, an available RE belongs to a second type, if there are both a DMRS and a CSI-RS in the slot, an available RE belongs to a third type.

Scenario 4: Available REs are classified based on a quantity of available REs in a slot.

For example, a quantity of available REs in one PRB and one slot may be 0 to 168. Specifically, for example, if the quantity of available REs is 0 to 32, an available RE belongs to a first type, if the quantity of available REs is 33 to 64, an available RE belongs to a second type, if the quantity of available REs is 65 to 128, an available RE belongs to a third type, if the quantity of available REs is 129 to 168, an available RE belongs to a fourth type.

Scenario 5: Classification may be performed based on a quantity of symbols available for data scheduling.

For example, a quantity of available symbols in one PRB and one slot may be 0 to 14. Specifically, for example, if the quantity of available symbols is 0 to 4, an available RE belongs to a first type, if the quantity of available symbols is 5 to 8, an available RE belongs to a second type, if the quantity of available symbols is 9 to 12, an available RE belongs to a third type, if the quantity of available symbols is 13 or 14, an available RE belongs to a fourth type.

Further, the communications device determines the type of the available RE by matching time-frequency resources for data scheduling and time-frequency features in classification criteria, where the time-frequency resources specifically include a time domain resource and a frequency domain resource, and the time-frequency features specifically include a symbol feature, a slot feature, an RB feature, and an RBG feature. After determining the type of the available RE, the communications device obtains a TBS value of the type based on the determined type of the available RE.

For example, when the terminal calculates the TBS, the TBS size for data scheduling is obtained by multiplying the TBS value of the type by a product of a quantity of slots in time domain in the classification criterion 2 and a quantity of RBs in frequency domain in the classification criterion 2.

It should be noted that a mutual conversion between different types may be performed in proportion.

In terms of a classification criterion 3, the type of the available RE is determined based on a symbol feature of one symbol in time domain and/or an RBG feature of one RBG in frequency domain.

Scenario 1: Available REs are classified based on information about a CSI-RS in each RBG.

Figure 5A:
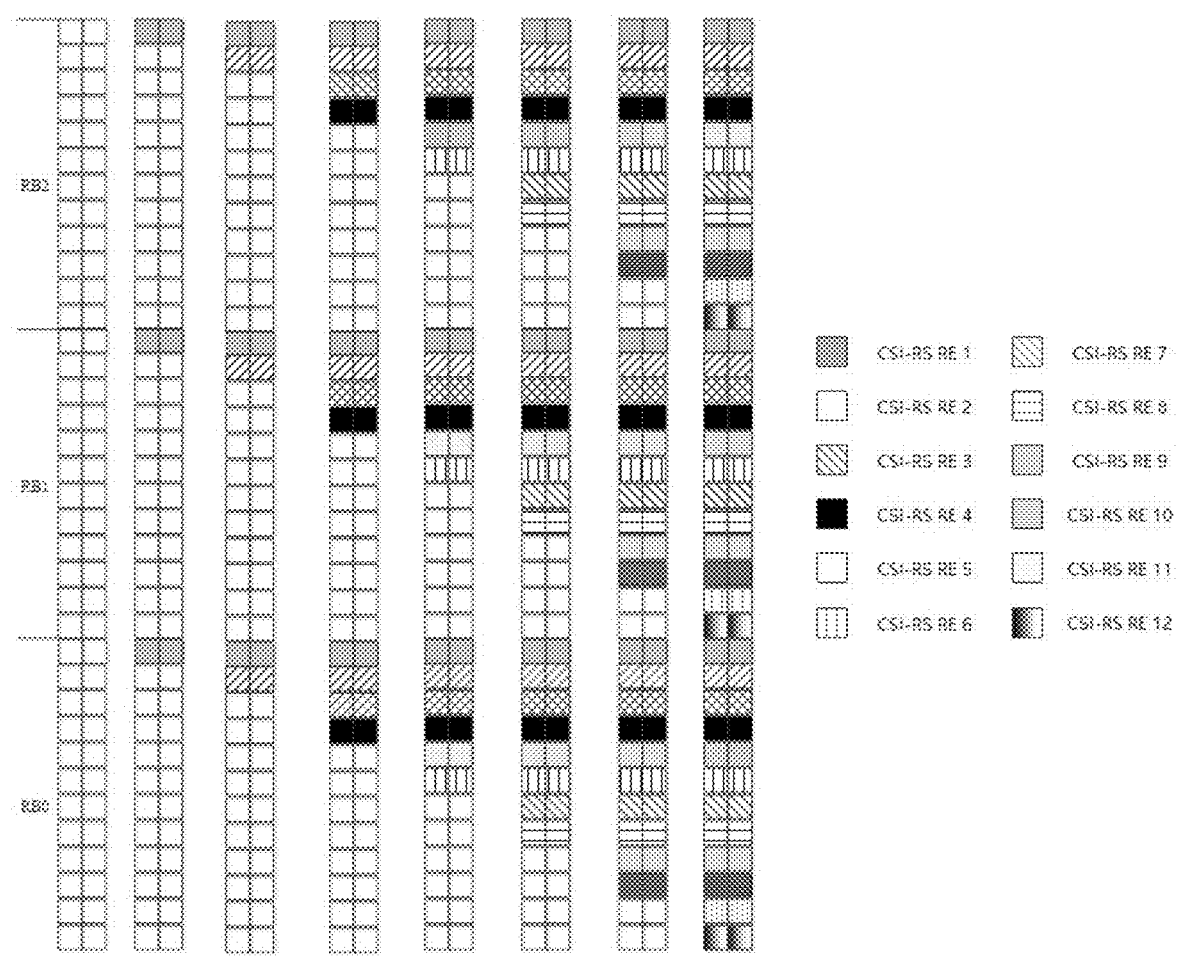
FIG. 5a to FIG. 5c are schematic diagrams of classifying available REs according to an embodiment of this application.
Figure 5B:
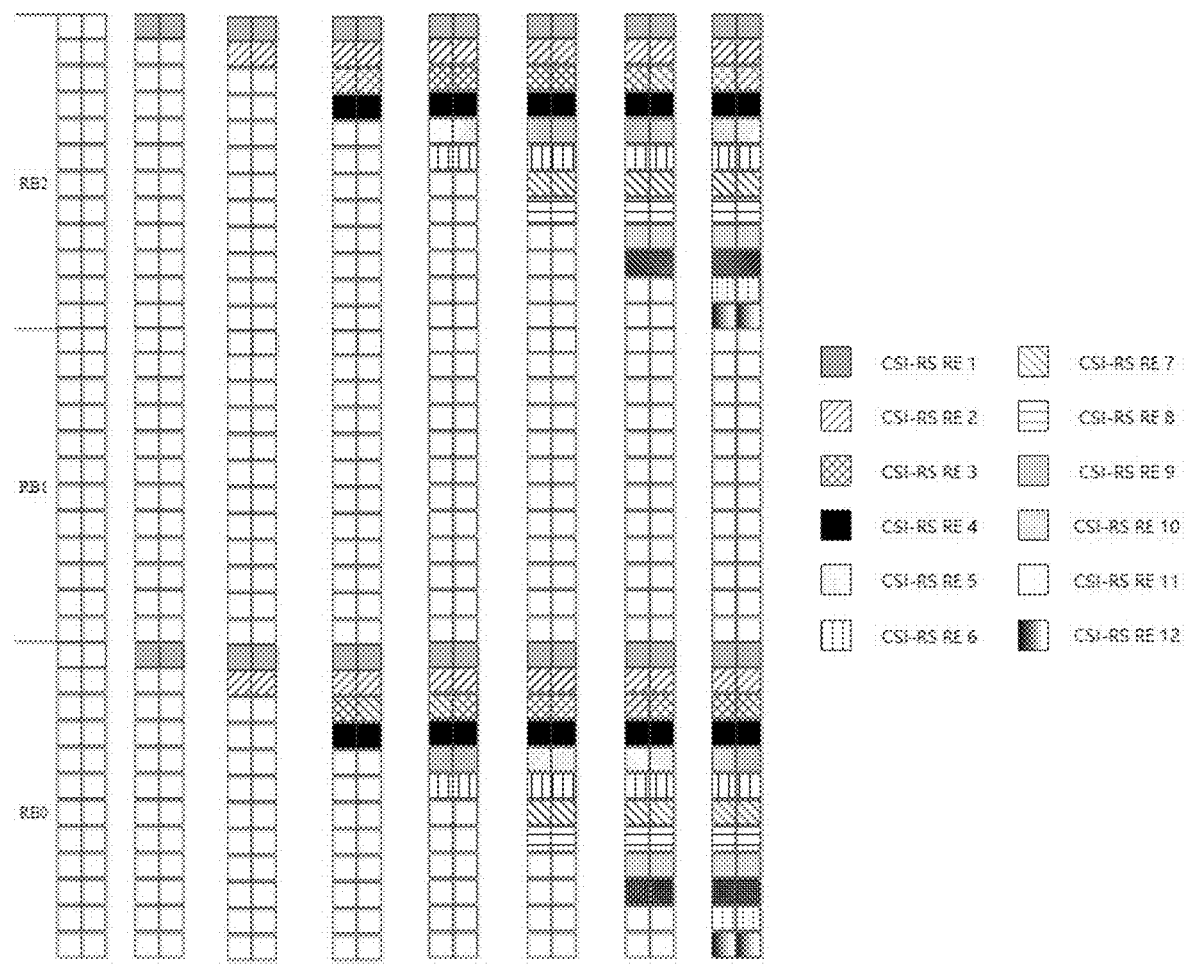
Figure 5C:
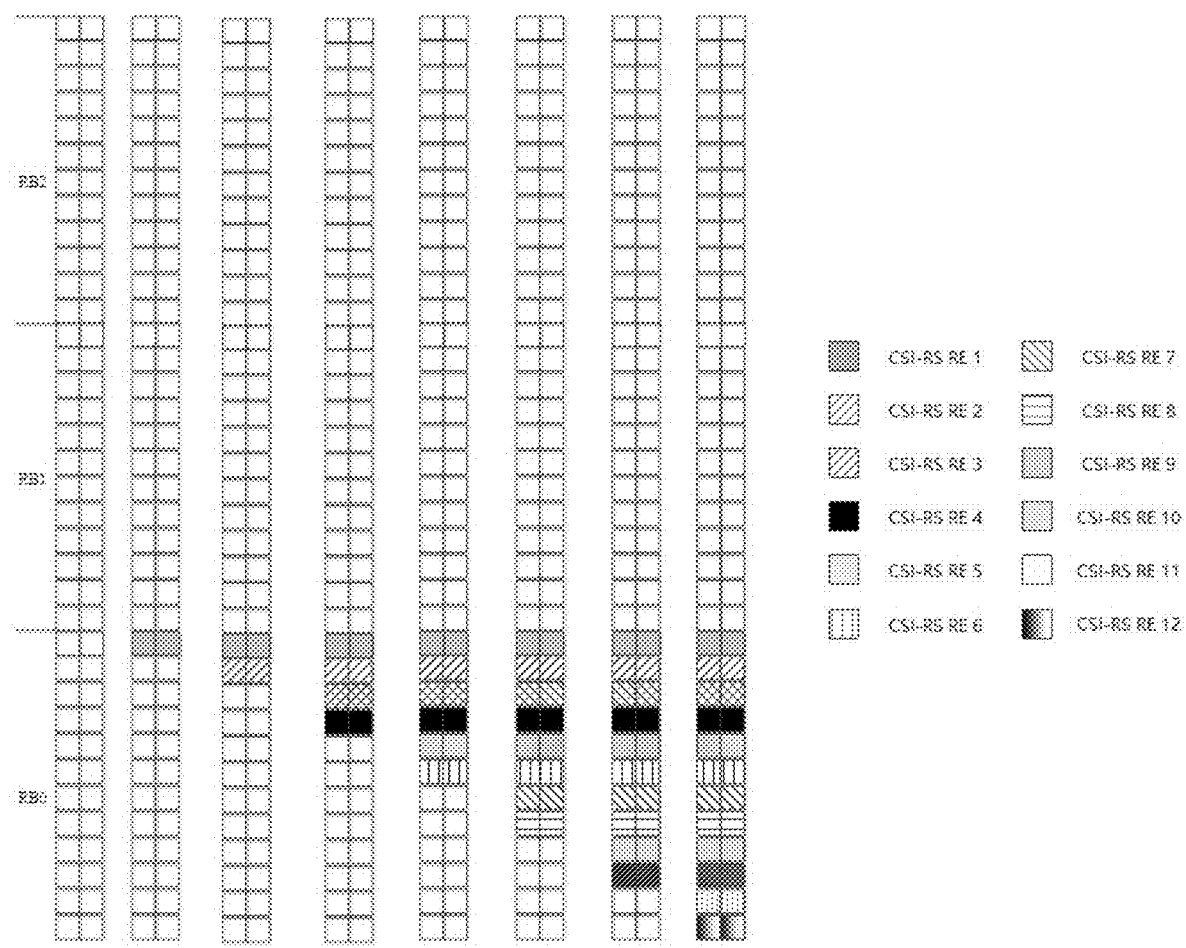

Type classification of the available REs may be performed based on a status of a CSI-RS in each RBG. FIG. 5a to FIG. 5c are schematic diagrams.

For example, for a case in which a CSI-RS occupies a same RE in each RB, type classification of the available REs may be performed in a manner shown in FIG. 5a.

For example, for a case in which REs occupied by a CSI-RS in an RB with an odd number are different from REs occupied by a CSI-RS in an RB with an even number and therefore the CSI-RS is sent every two RBs, type classification of the available REs may be performed in a manner shown in FIG. 5b.

For example, for a case in which REs occupied by a CSI-RS vary with an RB number obtained by performing a modulo operation on 3 and therefore the CSI-RS is sent every three RBs, type classification of the available REs may be performed in a manner shown in FIG. 5c.

Further, after the type of the available RE is determined, a TBS value of the type is obtained based on the determined type of the available RE.

For example, when the terminal calculates the TBS, the TBS size for data scheduling is obtained by multiplying the TBS value of the type by a product of a quantity of symbols in time domain in the classification criterion 3 and a quantity of RBGs in frequency domain in the classification criterion 3.

It should be noted that a mutual conversion between different types may be performed in proportion.

In terms of a classification criterion 4, the type of the available RE is determined based on a slot feature of one slot in time domain and/or an RBG feature of one RBG in frequency domain.

The classification criterion 4 is easily determined with reference to the classification criterion 3 and the classification criterion 2, and details are not described herein again.

The foregoing classification criteria are all classification criteria for a time domain feature of a single time domain scheduling unit and/or a frequency domain feature of a single frequency domain scheduling unit. According to the foregoing examples, a classification criterion for a time domain feature of a plurality of time domain scheduling units and/or a frequency domain feature of a plurality of frequency domain scheduling units may be easily inferred, and details are not described herein again.

In terms of a classification criteria 5, the type of the available RE for data scheduling is determined based on a service type of data scheduling.

For different service types, such as a mobile broadband service (eMBB), an ultra-reliable and low-latency communications (URLLC) service, a video service, a voice service, a small packet service, and a real-time service, different RE types and/or different scale factors and/or different TBS tables and/or different method for determining a TBS may be used. In other words, different service types may correspond to different RE types and/or different scale factors and/or different TBS tables and/or different methods for determining a TBS and/or different first quantities of available REs and/or different second quantities of available REs. Features of different services are considered, so that TBS values that meet different service requirements can be determined more accurately, and data transmission performance can be improved.

The URLLC may be a small packet service, and a transmission time for data scheduling may be one or more symbols. Therefore, type division of REs needs to be more refined. A value range of a TBS corresponding to a small packet service is relatively small. Therefore, a value interval of the TBS may be relatively small. The URLLC service requires high reliability and low latency. Therefore, a transmission code rate may be relatively low.

The eMBB may be a large packet service, and a transmission time for data scheduling may be one slot or more slots. Therefore, type division of REs may be relatively rough. A value range of a TBS is relatively large. Therefore, a value interval of the TBS may be relatively large.

Optionally, different services may require different code rates. For example, the eMBB service may require a small code rate or a large code rate, and the URLLC service requires a small code rate. Therefore, different services may have different modulation and coding schemes (MCS) tables. For example, an MCS table of the eMBB service may include a large quantity of code rates and a large quantity of MCS identifiers, where values of the code rates may be sorted in ascending order. However, an MCS table of the URLLC service may include a relatively small code rate or a small quantity of code rates and a small quantity of MCS identifiers. The MCS table may be used to indicate a modulation scheme and a TBS identifier, or may be used to indicate a modulation scheme and code rate information. Alternatively, the MCS table may include two tables. One table is used to indicate a modulation scheme, and the other table is used to indicate code rate information.

Specifically, an example in which the MCS table is used to indicate a modulation scheme and code rate information is used to indicate that different services may correspond to different MCS tables. Details are shown below.

Table 3 is an MCS table used for URLLC service transmission. Table 4 is an MCS table used for eMBB service transmission.

TABLE 3

| MCS Index $I_{MCS}$ | Modulation Order $Q_m$ | Code Rate R |
|---|---|---|
| 0 | 2 | 1/10 |
| 1 | 2 | 1/5 |
| 2 | 2 | 1/4 |
| 3 | 2 | 1/3 |
| 4 | 2 | 2/5 |
| 5 | 2 | 1/2 |
| 6 | 2 | 2/3 |
| 7 | 4 | 1/10 |
| 8 | 4 | 1/5 |
| 9 | 4 | 1/4 |
| 10 | 4 | 1/3 |
| 11 | 4 | 2/5 |
| 12 | 4 | 1/2 |
| 13 | 6 | 1/10 |
| 14 | 6 | 1/5 |
| 15 | 6 | 1/4 |

TABLE 4

| MCS Index $I_{MCS}$ | Modulation Order $Q_m$ | Code Rate R |
|---|---|---|
| 0 | 2 | 1/10 |
| 1 | 2 | 1/5 |
| 2 | 2 | 1/4 |
| 3 | 2 | 1/3 |
| 4 | 2 | 2/5 |
| 5 | 2 | 1/2 |
| 6 | 2 | 2/3 |
| 7 | 2 | 4/5 |
| 8 | 2 | 5/6 |
| 9 | 2 | 7/8 |
| 10 | 4 | 1/10 |
| 11 | 4 | 1/5 |
| 12 | 4 | 1/4 |
| 13 | 4 | 1/3 |
| 14 | 4 | 2/5 |
| 15 | 4 | 1/2 |
| 16 | 4 | 2/3 |
| 17 | 4 | 4/5 |
| 18 | 4 | 5/6 |
| 19 | 4 | 7/8 |
| 20 | 6 | 1/10 |
| 21 | 6 | 1/5 |
| 22 | 6 | 1/4 |
| 23 | 6 | 1/3 |
| 24 | 6 | 2/5 |
| 25 | 6 | 1/2 |
| 26 | 6 | 2/3 |
| 27 | 6 | 4/5 |
| 28 | 6 | 5/6 |
| 29 | 6 | 7/8 |
| 30 | 6 | Reserved |
| 31 | 6 | Reserved |

Different MCS tables are set for different services, so that MCS signaling overheads can be reduced. For example, for the URLLC service, a smaller MCS table may be designed when there are a relatively small quantity of code rates and/or modulation schemes and/or TBS values. When a base station notifies a terminal of an MCS, small bit information may be used, for example, an MCS index Table 3 may be represented by using four bits. However, for the eMBB service, a larger MCS table may be designed when there are a large quantity of code rates and/or modulation schemes and/or TBS values. When a base station notifies a terminal of an MCS, a large quantity of bit information may be used, for example, an MCS index Table 4 may be represented by using five bits. If a same MCS table is used for different services, representation is performed by using five bits for different services. Consequently, signaling overheads are relatively large.

Optionally, different classification criteria of available REs are used for different service types. For example, a classification criterion of one slot and one RB is used for eMBB, and a classification criterion of one symbol and one RB is used for URLLC.

Optionally, different scale factor values are used for different service types. For example, a value of 1, ½, or ¼ may be used for eMBB, and a value of 1, ½, ⅓, ¼, ⅔, or ¾ may be used for URLLC.

Optionally, different TBS tables are used for different service types. For example, a TBS table is formulated for eMBB based on 120 REs, and a TBS table is formulated for URLLC based on 60 REs. Different TBS tables may include different code rates.

For example, there are four code rates for eMBB in a same modulation scheme, and corresponding scale factors are respectively ½, ⅓, ⅔, ⅘, and the like. There are four or more code rates for URLLC in a same modulation scheme, and corresponding scale factors are respectively ½, ⅓, ¼, ⅖, and the like.

In addition, optionally, in a method for determining a TBS, different quantities of available REs may correspond to a same TBS value. The method in which different quantities of available REs correspond to a same TBS value may be specifically determined by specifying a correspondence between a value interval or a value range of a quantity of available REs and a TBS value. For example, if the value interval or the value range is N, quantities of available REs that are within the value interval N or the value range N correspond to a same TBS value. Specifically, quantities of available REs whose value interval is N correspond to a same TBS table, a same TBS value in a TBS table, or a same first quantity of available REs or a same second quantity of available REs in a calculation formula, or correspond to a same scale factor, or the like. This is not limited in this application.

A value of N may be defined for available REs in $X_1$ symbols in time domain and $Y_1$ RBs in frequency domain, or defined for available REs in $X_2$ symbols in time domain and $Y_2$ resource block groups RBGs in frequency domain, or defined for available REs in $X_3$ slots in time domain and $Y_3$ resource blocks RBs in frequency domain, or defined for available REs in $X_4$ slots in time domain and $Y_4$ RBGs in frequency domain, or defined for a total quantity of available REs for data scheduling, where $X_1$, $X_2$, $X_3$, $X_4$, $Y_1$, $Y_2$, $Y_3$, and $Y_4$ are positive integers. A specific definition method of N may be predefined, or the value of N may be notified by the base station to the terminal by using signaling, for example, higher layer signaling or physical layer signaling. This is not limited in this application.

Optionally, when a correspondence of a corresponding TBS value is determined based on the value of N, the TBS value may be the same as a TBS value corresponding to a smallest quantity of REs in the interval, or may be the same as a TBS value corresponding to a largest quantity of REs in the interval, or may be the same as a TBS value corresponding to a default quantity of REs in the interval. A specific determining method may be predefined, or the correspondence may be notified by the base station to the terminal by using signaling, and specific signaling is not limited in this application. The signaling may be higher layer signaling, physical layer signaling, or the like.

Optionally, when a correspondence of a corresponding TBS value is determined based on the value of N, the TBS value may be a TBS value corresponding to a default quantity of REs or default quantities of REs. When the TBS value is determined based on another quantity of REs, the TBS value may be the same as a TBS value corresponding to a quantity of REs that is nearest to a default quantity of REs or some default quantities of REs. A specific determining method may be predefined, or the correspondence may be notified by the base station to the terminal by using signaling, and specific signaling is not limited herein. The signaling may be higher layer signaling, physical layer signaling, or the like.

For example, a correspondence of a TBS value in the TBS table corresponding to the value interval N is used as an example. If it is stipulated that a value of N is 4, quantities of available REs whose value interval or value range is less than 4 are corresponding to a same TBS value. For example, if it is stipulated that a TBS value corresponding to a quantity, namely, 4, of available REs is A, a TBS value corresponding to a quantity, namely, 8, of available REs is B, and a TBS value corresponding to a quantity, namely, 12, of available REs is C, when a quantity of available REs is 3, a value of a corresponding TBS is A, when a quantity of available REs is 2, a corresponding TBS value is also A, when a quantity of available REs is 1, a corresponding TBS value is also A, when a quantity of available REs is 5, a corresponding TBS value may be A or B, when a quantity of available REs is 6, a corresponding TBS value may be A or B, when a quantity of available REs is 7, a corresponding TBS value may be B, when a quantity of available REs is 9, a corresponding TBS value may be B or C, when a quantity of available REs is 01, a corresponding TBS value may be B or C, and when a quantity of available REs is 11, a corresponding TBS value may be C. There may also be another corresponding case. This is not specifically limited. Optionally, the method in which different quantities of available REs correspond to a same TBS value may be specifically determined by specifying a correspondence between a division interval of a quantity of available REs and a TBS value. The division interval may include one or more intervals, and each interval corresponds to a TBS value. Specifically, quantities of available REs within an interval correspond to a same TBS table, a same TBS value in a TBS table, a same first quantity of available REs, or a same second quantity of second available REs in a calculation formula, or correspond to a same scale factor. This is not specifically limited herein. A specific interval division method may be predefined, or may be notified by the base station to the terminal by using signaling, and specific signaling is not limited herein. The signaling may be higher layer signaling, physical layer signaling, or the like.

Optionally, each division interval includes one or more quantities of available REs.

For example, a correspondence between a division interval of a quantity of available REs and a TBS value in a TBS table is used as an example. If three are three intervals obtained through division, for example, a range 1 from 0 to 4, a range 2 from 5 to 8, and a range 3 from 9 to 12, quantities of available REs in an interval correspond to a same TBS value in a TBS table. For example, if it is stipulated that a TBS value corresponding to the interval 1 is A, a TBS value corresponding to the interval 2 is B, and a TBS value corresponding to the interval 3 is C, when a quantity of available REs is 3, a corresponding TBS value may be A, when a quantity of available REs is 2, a corresponding TBS value is also A, when a quantity of available REs is 1, a corresponding TBS value is also A, when a quantity of available REs is 5, a corresponding TBS value may be B, when a quantity of available REs is 6, a corresponding TBS value may be B, when a quantity of available REs is 7, a corresponding TBS value may be B, when a quantity of available REs is 9, a corresponding TBS value may be C, when a quantity of available REs is 10, a corresponding TBS value may be C, and when a quantity of available REs is 11, a corresponding TBS value may be C. There may also be another corresponding case. This is not specifically limited.

A specific value of N or interval division may be predefined, or may be notified by the base station to the terminal by using signaling, for example, higher layer signaling or physical layer signaling. This is not specifically limited herein. The higher layer signaling may be radio resource control (RRC) signaling, a medium access control (MAC) control element (CE), or other signaling. This is not specifically limited herein. The physical layer signaling may be downlink control information, or the like. Optionally, for all the foregoing embodiments, type classification of available REs may be performed based on a quantity of REs by using a correspondence between a value interval or a value range of a quantity of available REs or a division interval of the quantity of available REs and a TBS, for example, based on a correspondence between a value interval or a value range of a quantity of REs or a division interval of the quantity of REs and a type of an available RE. This is not specifically limited herein.

A value interval, a value range, or a division interval is specified for a quantity of available REs or a quantity of REs, so that a plurality of quantities of available REs or REs may correspond to a same TBS value or correspond to a same type of an available RE, thereby avoiding a problem of excessive TBS values. The TBS value is not necessarily accurate to each RE. If there are excessive TBS values, system complexity increases, and a TBS exception value may occur. Consequently, data transmission performance deteriorates.

Optionally, for all the foregoing embodiments, if a quantity of transmission layers is not considered when a TBS value is being determined, a quantity of the transmission layers is considered as 1 by default. When a transport block for data scheduling is transmitted on a plurality of transmission layers, a quantity of transmission layers needs to be considered for determining a TBS value. For details, reference may be made to the prior art or another manner. This is not limited herein.

Figure 6:
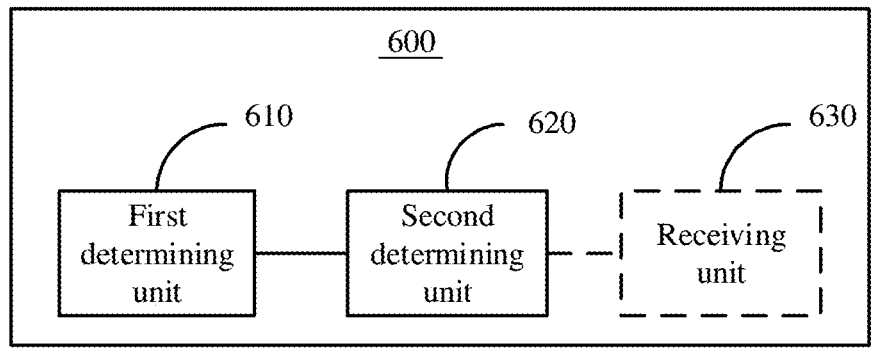
FIG. 6 is a schematic structural diagram of a communications apparatus according to an embodiment of this application.

Based on the foregoing embodiment, referring to FIG. 6, an embodiment of this application provides a communications apparatus 600. The apparatus 600 may be an independent network element, may be a terminal or a base station, or may be a function module in a corresponding network element. A structure of the apparatus 600 includes a first determining unit 610 and a second determining unit 620.

The first determining unit 610 is configured to determine a type of an available resource element RE for data scheduling.

The second determining unit 620 is configured to determine a transport block size of data based on the type of the available RE.

Optionally, when determining the type of the available RE for data scheduling, the first determining unit 610 is specifically configured to determine a classification criterion of available REs, and determine the type of the available RE for data scheduling based on the classification criterion of the available REs, where the classification criterion is determined based on a symbol feature of $X_1$ symbols in time domain and/or an RB feature of $Y_1$ RBs in frequency domain, or the classification criterion is determined based on a symbol feature of $X_2$ symbols in time domain and/or an RBG feature of $Y_2$ resource block groups RBGs in frequency domain, or the classification criterion is determined based on a slot feature of $X_3$ slots in time domain and/or an RB feature of $Y_3$ resource blocks RBs in frequency domain, or the classification criterion is determined based on a slot feature of $X_4$ slots in time domain and/or an RBG feature of $Y_4$ RBGs in frequency domain, or the classification criterion is a quantity of available REs for data scheduling, where $X_1$, $X_2$, $X_3$, $X_4$, $Y_1$, $Y_2$, $Y_3$, and $Y_4$ are positive integers.

Optionally, the symbol feature includes at least one of information about a reference signal in the symbols and a quantity of available REs in the symbols, the RB feature includes at least one of information about a reference signal in the RBs and a quantity of available REs in the RBs, the slot feature includes at least one of information about a reference signal in the slots, a quantity of available REs in the slots, and a quantity of available symbols in the slots, and the RBG feature includes at least one of information about a reference signal in the RBGs, a quantity of available REs in the RBGs, and a quantity of available RBs in the RBGs.

Optionally, the information about the reference signal includes at least one of whether there is the reference signal, a quantity of antenna ports of the reference signal, and a quantity of REs occupied by the reference signal.

Optionally, when the apparatus 600 is a terminal, the apparatus further includes a receiving unit 630, configured to receive first signaling sent by a base station, where the first signaling is used to indicate the classification criterion of the available REs. Alternatively, the first determining unit 610 is specifically configured to determine a predefined classification criterion of the available REs.

When the apparatus 600 is a base station, the first determining unit 610 is specifically configured to determine a predefined classification criterion of the available REs, or configure a classification criterion of the available REs based on a service feature of data scheduling.

Optionally, when determining the type of the available RE for data scheduling based on the classification criterion of the available REs, the first determining unit 610 is specifically configured to determine the type of the available RE for data scheduling based on the classification criterion of the available REs and a time-frequency resource for data scheduling.

Optionally, when determining the type of the available RE for data scheduling, the first determining unit 610 is specifically configured to determine a service type to which the data scheduling belongs, and determine the types of the available RE for data scheduling based on the service type, where different service types correspond to different types of available REs.

Optionally, when determining the transport block size of the data based on the type of the available RE, the second determining unit 620 is specifically configured to determine, based on the type of the available RE, a table of the transport block size corresponding to the type of the available RE, and determine the transport block size of the data based on the table of the transport block size, or determine the transport block size of the data based on the type of the available RE and a correspondence between the type of the available RE and the transport block size, or determine a scale factor corresponding to the type of the available RE, and multiply the scale factor by a preset value, to obtain the transport block size of the data, where the preset value is determined based on a preset table of a transport block size, or is calculated based on a modulation scheme, a code rate, a quantity of transmission layers, and a first quantity of available REs of the apparatus 600, and the first quantity of available REs is predefined or determined based on the time-frequency resource for data scheduling, or determine a second quantity of available REs that is corresponding to the type of the available RE, and obtain the transport block size of the data through calculation by using a modulation scheme, a code rate, a quantity of transmission layers, and the second quantity of available REs of the apparatus 600.

In this embodiment of this application, the first determining unit 610 and the second determining unit 620 may be implemented by a processor, and the receiving unit 630 may be implemented by a transceiver or a communications interface.

In addition, the communications apparatus provided in the embodiment shown in FIG. 6 may be further implemented in another form.

Figure 7:
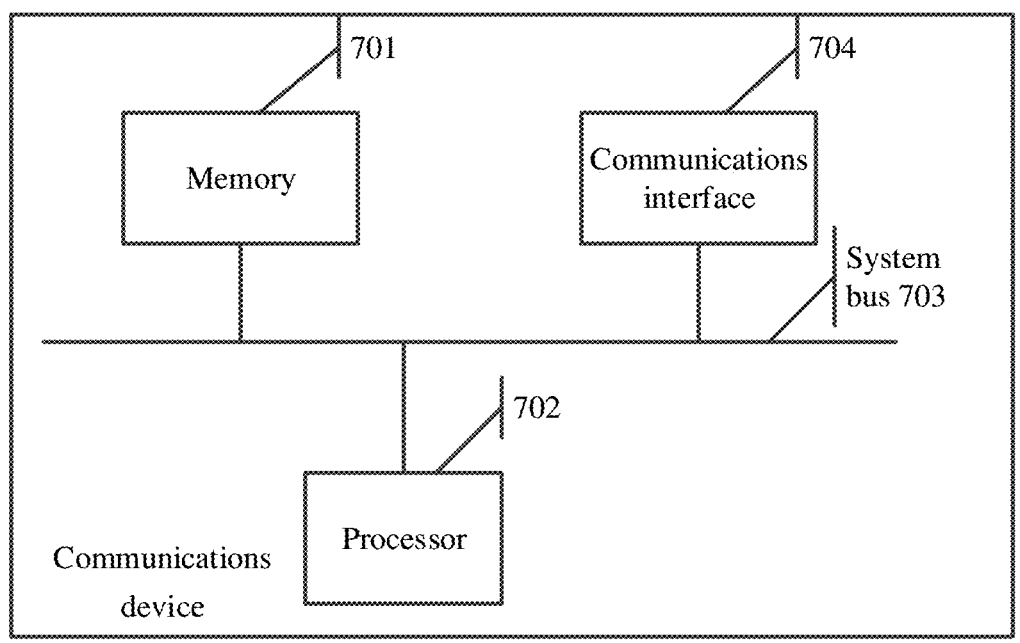
FIG. 7 is a schematic structural diagram of a communications device according to an embodiment of this application.

In a simple embodiment, a person skilled in the art may figure out that the communications apparatus provided in the embodiment shown in FIG. 6 may be implemented by using a structure shown in FIG. 7.

As shown in FIG. 7, a communications device may include a memory 701, a processor 702, a system bus 703, and a communications interface 704. The processor 702, the memory 701, and the communications interface 704 are connected by using the system bus 703. The memory 701 is configured to store a computer executable instruction. When the communications apparatus runs, the processor 702 executes the computer executable instruction stored in the memory 701, so that the communications device performs the method for determining a transport block size provided in the embodiment shown in FIG. 3. For a specific method for determining a transport block size, refer to the foregoing descriptions and related descriptions in the accompanying drawings. Details are not described herein again.

The processor 702 may be a general central processing unit (CPU), a microprocessor, an application-specific integrated circuit (ASIC), or one or more integrated circuits, and is configured to perform a related operation, to implement the technical solutions provided in the embodiments of this application.

Optionally, the communications device provided in the embodiment shown in FIG. 7 may be an FPGA, an ASIC, a system on chip (SoC), a CPU, a network processor (NP), a digital signal processing circuit (DSP), or a microcontroller unit (MCU). A programmable controller (PLD) or another integrated chip may also be used.

It should be noted that although only the memory 701, the processor 702, the system bus 703, and the communications interface 704 are shown in the communications device shown in FIG. 7, in a specific implementation process, a person skilled in the art shall understand that the communications device further includes another component necessary for implementing normal running. In addition, according to a specific requirement, a person skilled in the art should understand that the communications device may further include hardware components for implementing other additional functions. In addition, a person skilled in the art should understand that the communications device may include only components or modules necessary for implementing the embodiments of this application, but not necessarily include all the components shown in FIG. 7.

A person of ordinary skill in the art may understand that all or some of the processes of the methods in the embodiments may be implemented by a computer program instructing relevant hardware. The program may be stored in a computer readable storage medium. When the program runs, the processes of the foregoing method embodiments are performed. The foregoing storage medium may include a magnetic disk, an optical disc, a read-only memory (ROM), a random access memory (RAM), and the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, or the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A method, comprising:
   determining, by a communications device, a type of an available resource element (RE) for data scheduling according to a quantity of available REs in one slot and one resource block (RB), wherein the available RE is used to carry data; and
   determining, by the communications device according to a service type of the data scheduling, a scale factor corresponding to the type of the available RE, and multiplying the scale factor by a preset value, to obtain a transport block size of scheduled data;
   wherein the preset value is calculated based on a modulation scheme, a code rate, a quantity of transmission layers, and the quantity of available REs, and wherein the quantity of available REs is determined based on a time-frequency resource for the scheduled data.

2. The method according to claim 1, wherein the determining the type of an available RE comprises:
   determining, by the communications device, the type of the available RE according to a quantity of REs occupied by a demodulation reference signal (DMRS) in one slot in a time domain and one RB in a frequency domain.

3. The method according to claim 1, wherein the available REs are each REs that designated to carry information other than a reference signal (RS).

4. The method according to claim 1, wherein the determining the type of an available resource element (RE) comprises determining the type of the available RE according to a presence or location of a reference signal (RS) in one or more symbols in a time domain and one or more resource block groups in a frequency domain.

5. The method according to claim 1, wherein the determining the type of the available RE for data scheduling comprises:
   determining, by the communications device, a classification criterion of available REs and determining the type of the available RE for data scheduling based on the classification criterion of the available REs, wherein the classification criterion is determined based on at least one of:
   a symbol feature of $X_1$ symbols in at least one of a time domain or an RB feature of $Y_1$ RBs in a frequency domain, wherein $X_1$ and $Y_1$ are positive integers; or
   a symbol feature of $X_2$ symbols in at least one of the time domain or an resource block group (RBG)

feature of $Y_2$ RBGs in the frequency domain, wherein $X_2$ and $Y_2$ are positive integers.

6. The method according to claim 1, wherein the determining the type of the available RE for data scheduling comprises:
determining, by the communications device, a classification criterion of available REs and determining the type of the available RE for data scheduling based on the classification criterion of the available REs, wherein the classification criterion is determined based on at least one of:
at least one of a slot feature of $X_3$ slots in a time domain or an RB feature of $Y_3$ RBs in a frequency domain, wherein $X_3$ and $Y_3$ are positive integers; or
at least one of a slot feature of $X_4$ slots in the time domain or an RBG feature of $Y_4$ RBGs in the frequency domain, wherein $X_4$ and $Y_4$ are positive integers.

7. The method according to claim 1, wherein the determining the type of the available RE for data scheduling comprises:
determining, by the communications device, a classification criterion of available REs and determining the type of the available RE for data scheduling based on the classification criterion of the available REs, wherein the classification criterion is determined based on a quantity of available REs for data scheduling.

8. A communications apparatus, comprising:
one or more processors; and
a non-transitory computer-readable storage medium storing a program to be executed by the processor, the program including instructions to:
determine a type of an available resource element (RE) for data scheduling according to a quantity of available REs in one slot and one resource block (RB), wherein the available RE is used to carry data; and
determine according to a service type of the data scheduling, a scale factor corresponding to the type of the available RE, and multiplying the scale factor by a preset value, to obtain a transport block size of scheduled data;
wherein the preset value is calculated based on a modulation scheme, a code rate, a quantity of transmission layers, and the quantity of available REs, and wherein the quantity of available REs is determined based on a time-frequency resource for the scheduled data.

9. The apparatus according to claim 8, wherein the instructions to determine the type of the available RE includes instructions to:
determine the type of the available RE according to a quantity of REs occupied by a demodulation reference signal (DMRS) in one slot in a time domain and one RB in a frequency domain.

10. The apparatus according to claim 8, wherein the available REs are each REs that designated to carry information other than a reference signal (RS).

11. The apparatus according to claim 8, wherein the instructions to determine the type of an available resource element (RE) include instructions to determine the type of the available RE according to a presence or location of a reference signal (RS) in one or more symbols in a time domain and one or more resource block groups in a frequency domain.

12. The apparatus according to claim 8, wherein the instructions to determine the type of the available RE for data scheduling include instructions to:
determine a classification criterion of available REs and determining the type of the available RE for data scheduling based on the classification criterion of the available REs, wherein the classification criterion is determined based on at least one of:
a symbol feature of $X_1$ symbols in at least one of a time domain or an RB feature of $Y_1$ RBs in a frequency domain, wherein $X_1$ and $Y_1$ are positive integers; or
a symbol feature of $X_2$ symbols in at least one of the time domain or an resource block group (RBG) feature of $Y_2$ RBGs in the frequency domain, wherein $X_2$ and $Y_2$ are positive integers.

13. The apparatus according to claim 8, wherein the instructions to determine the type of the available RE for data scheduling include instructions to:
determine a classification criterion of available REs and determining the type of the available RE for data scheduling based on the classification criterion of the available REs, wherein the classification criterion is determined based on at least one of:
at least one of a slot feature of $X_3$ slots in a time domain or an RB feature of $Y_3$ RBs in a frequency domain, wherein $X_3$ and $Y_3$ are positive integers; or
at least one of a slot feature of $X_4$ slots in the time domain or an RBG feature of $Y_4$ RBGs in the frequency domain, wherein $X_4$ and $Y_4$ are positive integers.

14. The apparatus according to claim 8, wherein the instructions to determine the type of the available RE for data scheduling include instructions to:
determine a classification criterion of available REs and determining the type of the available RE for data scheduling based on the classification criterion of the available REs, wherein the classification criterion is determined based on a quantity of available REs for data scheduling.

15. A non-transitory computer-readable medium storing instructions that, when executed by one or more processors, cause the one or more processors to:
determine a type of an available resource element (RE) for data scheduling according to a quantity of available REs in one slot and one resource block (RB), wherein the available RE is used to carry data; and
determine according to a service type of the data scheduling, a scale factor corresponding to the type of the available RE, and multiplying the scale factor by a preset value, to obtain a transport block size of scheduled data;
wherein the preset value is calculated based on a modulation scheme, a code rate, a quantity of transmission layers, and the quantity of available REs, and wherein the quantity of available REs is determined based on a time-frequency resource for the scheduled data.

16. The non-transitory computer-readable medium according to claim 15, wherein the instructions that cause the one or more processors to determine the type of the available RE for data scheduling include instructions that, when executed by one or more processors, cause the one or more processors to:
determine the type of the available RE according to a quantity of REs occupied by a demodulation reference signal (DMRS) in one slot in time domain and one RB in frequency domain.

17. The non-transitory computer-readable medium according to claim 15, wherein the available REs are each REs that designated to carry information other than a reference signal (RS).

18. The non-transitory computer-readable medium according to claim 15, wherein the instructions that cause the one or more processors to determine the type of the available RE for data scheduling include instructions that, when executed by one or more processors, cause the one or more processors to:
  determine a classification criterion of available REs and determining the type of the available RE for data scheduling based on the classification criterion of the available REs, wherein the classification criterion is determined based on at least one of:
    a symbol feature of $X_1$ symbols in at least one of a time domain or an RB feature of $Y_1$ RBs in a frequency domain, wherein $X_1$ and $Y_1$ are positive integers; or
    a symbol feature of $X_2$ symbols in at least one of the time domain or an resource block group (RBG) feature of $Y_2$ RBGs in the frequency domain, wherein $X_2$ and $Y_2$ are positive integers.

19. The non-transitory computer-readable medium according to claim 15, wherein the instructions that cause the one or more processors to determine the type of the available RE for data scheduling include instructions that, when executed by one or more processors, cause the one or more processors to:
  Determine a classification criterion of available REs and determining the type of the available RE for data scheduling based on the classification criterion of the available REs, wherein the classification criterion is determined based on at least one of:
    at least one of a slot feature of $X_3$ slots in a time domain or an RB feature of $Y_3$ RBs in a frequency domain, wherein $X_3$ and $Y_3$ are positive integers; or
    at least one of a slot feature of $X_4$ slots in the time domain or an RBG feature of $Y_4$ RBGs in the frequency domain, wherein $X_4$ and $Y_4$ are positive integers.

20. The non-transitory computer-readable medium according to claim 15, wherein the instructions that cause the one or more processors to determine the type of the available RE for data scheduling include instructions that, when executed by one or more processors, cause the one or more processors to:
  determine a classification criterion of available REs and determining the type of the available RE for data scheduling based on the classification criterion of the available REs, wherein the classification criterion is determined based on a quantity of available REs for data scheduling.

* * * * *